United States Patent [19]
Ingham

[11] 3,848,504
[45] Nov. 19, 1974

[54] MUSICAL TOY
[76] Inventor: Kenneth W. Ingham, 49 Joycelyn Cres., Georgetown, Ontario, Canada
[22] Filed: Sept. 26, 1973
[21] Appl. No.: 401,048

[52] U.S. Cl.................. 84/402, 46/191, 46/193
[51] Int. Cl. ............................................ G10d 13/08
[58] Field of Search ..................... 84/402–410, 84/470–485; 46/174, 189, 191, 193

[56] References Cited
UNITED STATES PATENTS
1,084,718  1/1914  Wanamaker ................... 46/193
1,668,505  5/1928  Haney ......................... 84/404 X
2,197,096  4/1940  Cyr ............................ 46/193
2,211,102  8/1940  Davis .......................... 46/193

Primary Examiner—Lawrence R. Franklin
Attorney, Agent, or Firm—Howard I. Podell

[57] ABSTRACT

A musical toy in the form of a flat shape on which four metallic disc keys are mounted such that each of these metallic discs can be manually tapped to produce a distinctive musical tone. Each metallic key disc is loosely mounted in a metallic retainer cap fitted to the base of the device.

3 Claims, 3 Drawing Figures

MUSICAL TOY

SUMMARY OF THE INVENTION

My invention relates to a rhythmical musical toy which has individual metallic keys mounted on a base located so that each of the metallic discs can be tapped by four fingers simultaneously or the keys may be individually tapped in a desired sequence.

Each metallic key disc is mounted loosely in a metallic hollow retainer cap. A clip is attached to the underside of the base of the device to allow the musical toy to be mounted onto the belt or pocket of the user, or the toy may be hand-held.

The four fingers of the hand of the user is positioned by means of a thumb rest holder on the underside of the base.

A major advantage of my invention is that it provides a new type of inexpensive musical instrument for entertainment as well as an educational tool for teaching rhythmic musical sounds, and for use in training handicapped children.

BRIEF DESCRIPTION OF THE DRAWING

The objects and features of the invention may be understood with reference to the following detailed description of an illustrative embodiment of the invention, taken together with the accompanying drawing in which.

Figure 1:
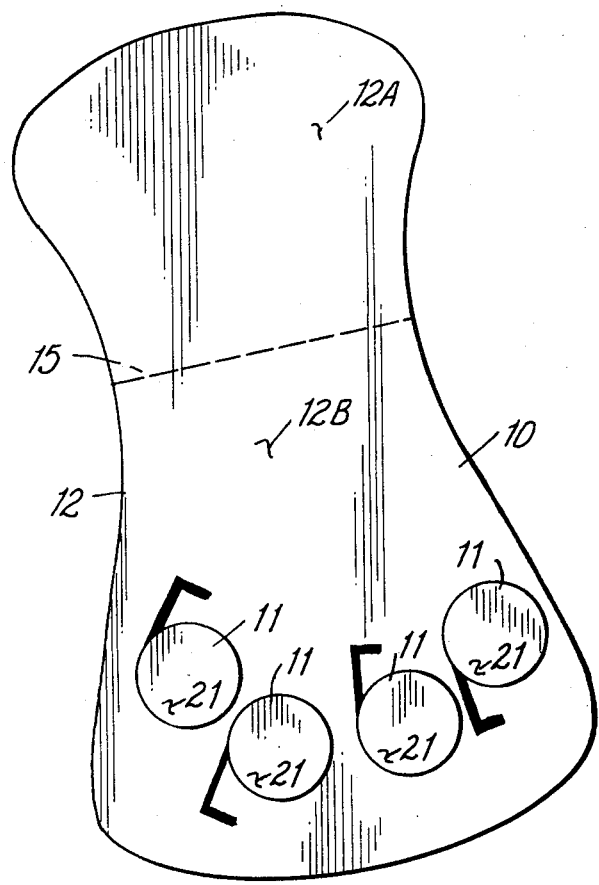
FIG. 1 illustrates a top view of the invention.
Figure 2:
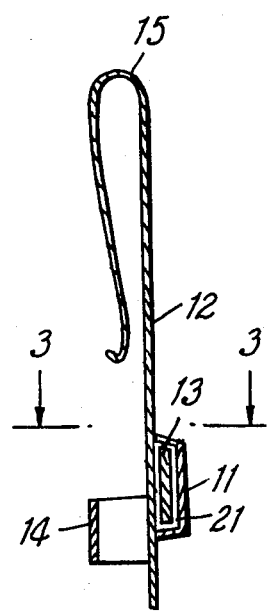
FIG. 2 illustrates a side sectional view of the invention.
Figure 3:
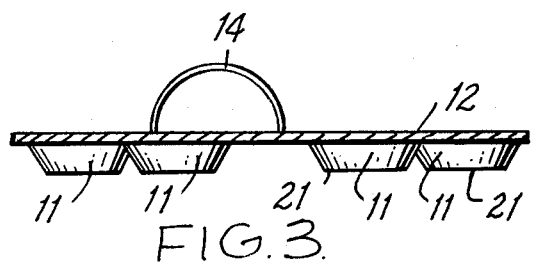
FIG. 3 illustrates an end view of the invention.

DESCRIPTION OF THE PREFERRED EMBODIMENT:

Turning now descriptively to the drawing, in which similar reference characters denote similar elements throughout the several views, FIGS. 1–3 show the device 10, with four metal hollow retainer caps 11 bonded to a base sheet 12 in an arrangement that allows each of the four fingers of a user's hand to be positioned simultaneously on the top 21 of one of the retainer caps 11.

Within the open interior of the cylindrical-shaped cap 11 is loosely fitted a metal disc 13 of a diameter smaller than the inside diameter of the retaining cap 11. An open fixed loop 14 of sheet material is fitted to the underside of the base 12 of a size to allow the insertion of the user's thumb between the base 12 and the loop 14 to serve as a thumb rest holder, when holding the device as a castanet.

The base section 12 is fitted with a pre-creased fold line 15 so that the base 12 may be folded about line 15, with one section 12A fitting behind a belt or pocket of the user and the other section 12B exposed for playing purposes.

The base seciton 12 may be formed of a semi-rigid cardboard or plastic material.

In use, the player inserts his thumb into loop 14, and automatically positions his fingers with respect to each of the four retainers 11 so that he can create musical tones by striking the top 21 of one or more retainers 11 with one or more fingers.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A musical toy instrument formed of a flat base on which is mounted a plurality of hollow capped metal cylinders, each with a metal disc loosely fitted in the interior of the cylinder, the base of the instrument being formed of a non-metallic semi-rigid material, with said cylinders and discs mounted, each spaced with relation to each other so as to correspond to the spacing of fingers of the user, together with a thumb rest holder mounted on the base of the device to enable the user to position the fingers of a hand with respect to the location of the individual cylinders, so as to be able to individually tap each cylinder with a specific finger.

2. The combination as recited in claim 1, in which four cylinders are mounted on the base.

3. The combination as recited in claim 1 in which the thumb rest holder is mounted to project from the underside of the base, with the cylinders each projecting from the opposed surface of the base.

* * * * *